(No Model.)

F. B. AUSTIN.
AMALGAMATOR.

No. 583,354. Patented May 25, 1897.

WITNESSES:
H. Walker
C. R. Ferguson

INVENTOR
F. B. Austin
BY
Munn &
ATTORNEYS.

UNITED STATES PATENT OFFICE.

FRANCIS B. AUSTIN, OF TEMPE, ARIZONA TERRITORY.

AMALGAMATOR.

SPECIFICATION forming part of Letters Patent No. 583,354, dated May 25, 1897.

Application filed September 12, 1896. Serial No. 605,583. (No model.)

*To all whom it may concern:*

Be it known that I, FRANCIS B. AUSTIN, of Tempe, in the county of Maricopa and Territory of Arizona, have invented a new and Improved Amalgamator, of which the following is a full, clear, and exact description.

This invention relates to that class of apparatus employed for extracting gold from gold ore by amalgamation; and the object is to produce a simple apparatus in which the finer particles or flour will be effectively extracted from the running water in a sluice and in which the larger particles will be taken up or amalgamated in a mercury-pan.

I will now describe an amalgamator embodying my invention and then point out the novel features in the appended claims.

Reference is to be had to the accompanying drawings, forming a part of this specification, in which similar characters of reference indicate corresponding parts in all the figures.

Figure 1:
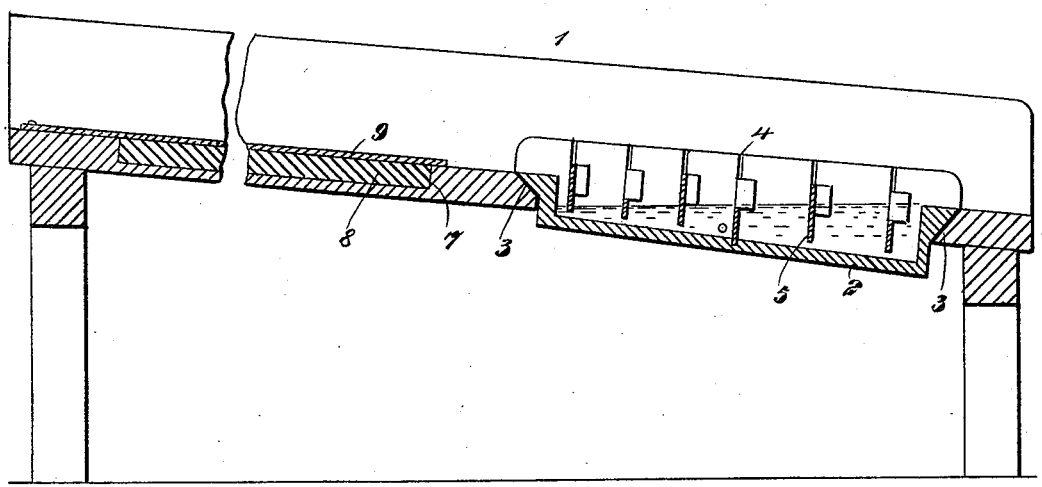
Figure 2:
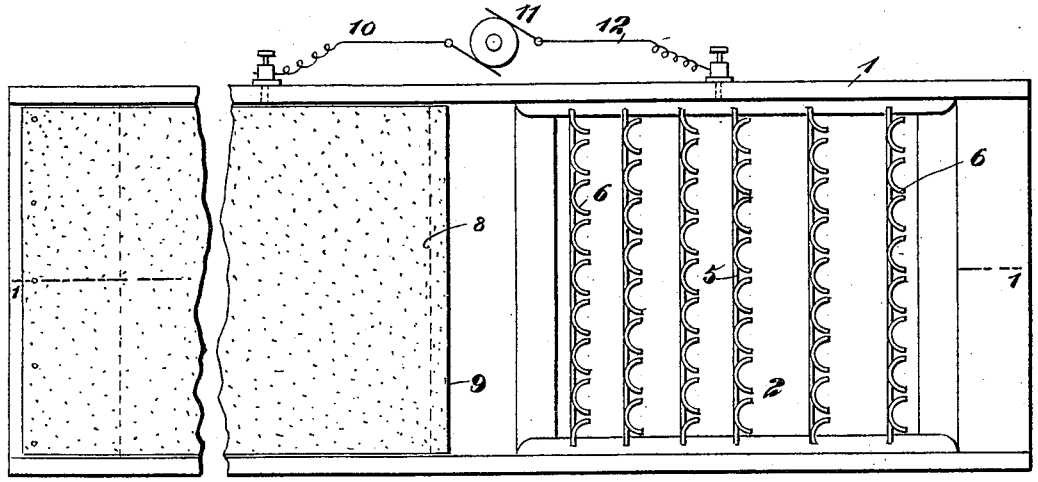
Figure 3:
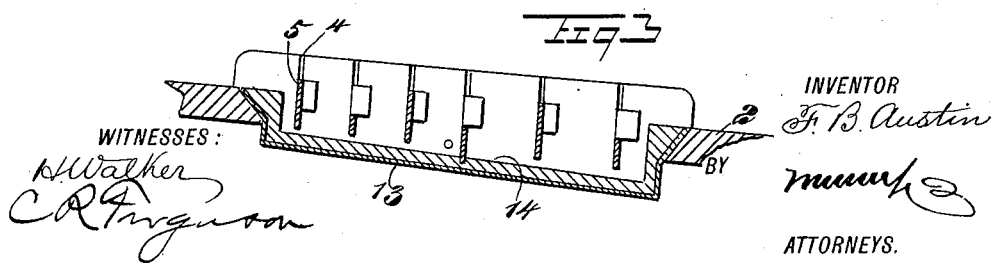

Figure 1 is a longitudinal section on the line 1 1 of Fig. 2 of an amalgamator embodying my invention. Fig. 2 is a plan view thereof, and Fig. 3 is a longitudinal section showing a modified form of a portion of the apparatus.

The apparatus comprises a sluiceway 1 of any suitable length and width and having a downward pitch in the usual manner. The lower end of this sluice has an opening in its bottom wall, within which is placed a mercury-pan 2 of any suitable insulating material—such, for instance, as porcelain, glass, or earthenware. This pan 2 has inclined end pieces 3, designed to engage upon corresponding inclines at the ends of the opening through the bottom of the sluice, and it is provided at its sides with vertical grooves 4, in which the ends of copper plates are removably engaged. The central plate 5 extends into a groove formed in the bottom of the pan 2, and thus forms the pan into two sections, although I do not confine my invention to any particular number of sections. The plates 5 of these two sections, however, do not extend entirely to the bottom of the pan, but there is sufficient space between the lower edges of these plates and the bottom of the pan for the free circulation of mercury. The bottom of the pan 2 has a pitch substantially that of the sluice, and by running the central plate 5 to the bottom thereof the depth of the mercury in the upper section of the pan will be maintained on the level or slightly above the level of the mercury in the lower section of the pan. The upper edge of each plate 5 has lugs 6, curved toward the lower end of the sluiceway. These lugs 6 serve to catch or retard the material flowing over the same.

The bottom of the sluice 1 at a point above the pan 2 is provided with a recess 7, in which is seated a plate of carbon, 8, which extends entirely across the sluiceway, and arranged above this carbon plate is a blanket 9 of any suitable textile material. This blanket 9 is preferably secured at its upper end to the bottom of the sluiceway. As here shown, it is secured to the sluiceway by means of tacks or nails. The lower end and sides of this blanket are entirely free and the carbon plate serves as an anode only.

The carbon plate is connected through a wire 10 with the positive pole of a source of electricity, which is here indicated as a dynamo or generator 11, the other pole of said generator being connected through a wire 12 with the mercury in the pan 2.

It may be inconvenient in some localities to obtain pans of porcelain, glass, or like material, owing to the excessive freight charges or other causes, and as a substitute therefor I may employ a pan constructed as indicated in Fig. 3. This pan consists of a suitable boxing 13, seated in the opening in the bottom of the sluice and lined with hydraulic cement or like material 14. This hydraulic cement is a non-conductor of electricity. Therefore it will come within the terms of my claim to a pan of insulating material. I have here shown but one carbon plate and a certain number of copper plates, but it is understood that I do not limit my invention to any particular number of either of the plates. Neither do I limit my invention to the size of the respective parts, as such sizes will be regulated somewhat by the locality in which the device is employed.

In operation the ore is flooded over the sluiceway with water in the usual manner. Upon reaching the pan 2 the heavier portions of the gold will be retarded by the plates 5 and fall into the mercury and become amalgamated therewith, the electric current of course stimulating this action, and fine flour and flake gold will be retained by copper plates in the usual manner of all amalgamation on copper plates. A main use of the blanket is to protect the carbon plate from undue wear.

It will be seen that the amalgamator embodying my invention is a very simple construction, and that the several plates 5 may be easily removed for the purpose of cleansing them of the amalgam, &c.

Having thus described my invention, I claim as new and desire to secure by Letters Patent—

1. An amalgamator, comprising a sluiceway, a pan of insulating material arranged within the sluiceway, for containing mercury, metal partitions arranged in the pan, a carbon plate arranged in the bottom of the sluiceway above said pan, and a source of electricity one pole of which connects with the mercury-pan and the other pole connects with the carbon plate, substantially as specified.

2. An amalgamator, comprising a sluiceway having an opening in the bottom, a pan of insulating material arranged in said opening, copper plates extended transversely in said pan, certain of said plates extending entirely to the bottom of the pan, there being a space between the lower edges of other plates and the bottom of the pan, a carbon plate seated in a recess formed in the bottom of the sluiceway above the pan, an electric generator, a connection between the positive pole of said generator and the carbon plate, and a connection between the negative pole of said generator and the interior of the pan, substantially as specified.

3. An amalgamator, comprising a sluiceway, a pan of porcelain or like insulating material arranged in the bottom thereof, copper plates extended transversely in said pan and having lugs at the upper edge extended toward the lower end of the sluice, a carbon plate arranged in the bottom of said sluice above the pan, a blanket arranged over said carbon plate, a source of electricity, a connection between the positive pole of said source of electricity and the carbon plate, and a connection between the negative pole of said source of electricity and the interior of the mercury-pan, substantially as specified.

4. In an amalgamator, the combination with a sluiceway having an opening in its bottom, of a mercury-pan of insulating material arranged in said opening, metal plates extending transversely of the pan and provided with curved lugs projecting toward the lower end of the sluiceway, said plates extending to within a short distance of the bottom of the pan, a carbon plate seated in the bottom of the sluiceway above the pan, and a source of electricity having one pole connected with the carbon plate and the other with the mercury of the pan, substantially as herein shown and described.

5. In an amalgamator, a mercury-pan formed of insulating material and provided with vertical grooves in the inner faces of its sides, and metal plates fitting the grooves of the pan and extending nearly to the bottom of the said pan, said plates being provided with curved lugs, substantially as described.

FRANCIS B. AUSTIN.

Witnesses:
CHARLES J. ULMER,
WILLIAM SELLER.